United States Patent
Aazizou et al.

(10) Patent No.: US 6,457,380 B1
(45) Date of Patent: Oct. 1, 2002

(54) CONNECTING ROD INTENDED TO LIMIT RELATIVE MOVEMENTS BETWEEN TWO RIGID COMPONENTS

(75) Inventors: Khalid Aazizou, La Chapelle Du Noyer; Gilles Sauvat, Cloyes sur Loir, both of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/569,078

(22) Filed: May 11, 2000

(30) Foreign Application Priority Data

May 21, 1999 (FR) .............................. 99 06482

(51) Int. Cl.[7] .................................................. G05G 1/00
(52) U.S. Cl. ...................................................... 74/579 E
(58) Field of Search ........................... 74/579 E, 579 R; 29/888.09; 123/90.61; 180/312

(56) References Cited

U.S. PATENT DOCUMENTS

| | | | | |
|---|---|---|---|---|
| 1,756,211 A | * | 4/1930 | Reid .......................... | 74/579 E |
| 1,770,644 A | * | 7/1930 | Hartog ....................... | 74/579 E |
| 1,981,609 A | * | 11/1934 | Berland ...................... | 74/579 E |
| 3,338,113 A | * | 8/1967 | Camp et al. ................. | 74/579 |
| 3,388,615 A | * | 6/1968 | Ditlinger .................... | 74/579 R |
| 3,559,503 A | | 2/1971 | Elsbett ....................... | 74/479 |
| 4,403,525 A | * | 9/1983 | Bongers ...................... | 74/579 E |
| 4,414,860 A | * | 11/1983 | Brunsch et al. .............. | 74/579 E |
| 4,691,590 A | | 9/1987 | Geringer et al. ............. | 74/579 E |
| 5,660,086 A | * | 8/1997 | Carey ......................... | 74/579 E |

FOREIGN PATENT DOCUMENTS

| | | | | |
|---|---|---|---|---|
| EP | 0 176 934 | | 4/1986 | |
| EP | 0 229 227 | | 9/1986 | |
| FR | 746785 | * | 6/1933 | ............... 74/579 E |
| FR | 2 765 503 | | 1/1999 | |
| GB | 413272 | * | 7/1934 | ............... 74/579 E |
| GB | 898268 | * | 6/1962 | ............... 74/579 E |
| GB | 981446 | * | 1/1965 | ............... 74/579 E |
| GB | 1 094 950 | | 12/1967 | |
| IT | 483765 | * | 8/1953 | ............... 74/579 E |

OTHER PUBLICATIONS

French Preliminary Search Report dated Jan. 18, 2000, French Application FR 9906482.

* cited by examiner

*Primary Examiner*—David A. Bucci
*Assistant Examiner*—Chong H. Kim
(74) *Attorney, Agent, or Firm*—Marshall, Gerstein & Borun

(57) ABSTRACT

This connecting rod is intended to be connected between two rigid components in order to limit their relative movements in a longitudinal direction. The connecting rod comprises a long rigid body which extends in the longitudinal direction and which connects two bushes. The body comprises two opposite external longitudinal ribs and an external transverse rib. The rib has first and second halves symmetrical relative to a median plane containing the longitudinal direction, the first half connecting the first bush and the first external longitudinal rib, and the second half connecting the first bush and the second external longitudinal rib.

3 Claims, 3 Drawing Sheets

CONNECTING ROD INTENDED TO LIMIT RELATIVE MOVEMENTS BETWEEN TWO RIGID COMPONENTS

FIELD OF THE INVENTION

The invention concerns connecting rods intended to limit relative movements between first and second rigid components, mainly in a longitudinal direction.

The connecting rods of the type in question are for example intended to connect, on the one hand, the bodyworks of vehicles and, on the other hand, the internal combustion engines of the vehicles considered, In particular (but not exclusively) pendular suspension engines.

They are assembled so as to work mainly in tension and in compression in their longitudinal direction.

Among these connecting rods, the invention concerns more particularly those including a long rigid body which extends approximately in the longitudinal direction and which connects first and second bushes, these two bushes being intended to be articulated respectively relative to the rigid components and having respectively central axes parallel to each other and perpendicular to the longitudinal direction, said body comprising two opposite longitudinal sides on which are formed respectively first and second external longitudinal ribs which each extend between the two bushes, the connecting rod body comprising moreover at least one first transverse rib comprising:

a first part which connects the first bush and the first external longitudinal rib so as to form a first triangular structure with a first portion of said first bush and a first portion of the first external longitudinal rib, and a second part connecting the first bush and the second external longitudinal rib so as to form a second triangular structure with a second portion of the said first bush and a first portion of the second external longitudinal rib.

BACKGROUND OF THE INVENTION

The document GB-A-1 094 950 describes a connecting rod of this type, which has the disadvantage that its bushes can in certain cases deform by ovalisation following tensile forces supported by said connecting rod.

OBJECTS AND SUMMARY OF THE INVENTION

The particular object of the present invention is to remedy this disadvantage.

To this end, the first and the second external longitudinal ribs each comprise at least two parts which diverge respectively from first and second bushes forming with the longitudinal direction an acute angle greater than 10°.

Thanks to these arrangements, the resistance of the connecting rod vis-à-vis tensile forces is significantly improved, or on the contrary the mass of the connecting rod can be significantly reduced in order to obtain mechanical performances similar to the performances obtained in the prior art.

In preferred versions of the connecting rod according to the invention, recourse can possibly be had moreover to one and/or other of the following arrangements:

the first transverse rib is approximately rectilinear;
the first transverse rib is bent in its middle, having a concavity turned towards the second bush;
the body comprises in addition a second transverse rib which comprises:

a first part which connects the second bush and the first external longitudinal rib so as to form a third triangular structure with a first portion of said second bush and a second portion of the first external longitudinal rib, and a second part connecting the second bush and the second external longitudinal rib so as to form a fourth triangular structure with a second portion of said second bush and a second portion of the second external longitudinal rib;

the second transverse rib is approximately rectilinear;
the second transverse rib is bent in its middle, having a concavity turned towards the first bush;
the two bushes are connected by at least one central longitudinal rib which is arranged between the first and second external longitudinal ribs and which is connected to each transverse rib;
the first and second external longitudinal ribs are approximately rectilinear;
the two divergent parts of each external longitudinal rib meet at the junction point between said external longitudinal rib and the first transverse rib
the two divergent parts of the first and second external longitudinal ribs are constituted respectively by said first and second portions of each external longitudinal rib, said first and second portions of each external longitudinal rib being connected by means of a rectilinear part which belongs to the corresponding external longitudinal rib.

BRIEF DESCRIPTION OF THE DRAWINGS

Other characteristics and advantages of the present invention will become apparent during the following detailed description of four of its versions, given as non-restrictive examples, by reference to the attached drawings.

On the drawings

FIG. 2 is a plan view of a second version of the invention,

FIGS. 3 to 6 are similar views to FIG. 2, respectively for third, fourth, fifth and sixth versions.

MORE DETAILED DESCRIPTION

Figure 1:
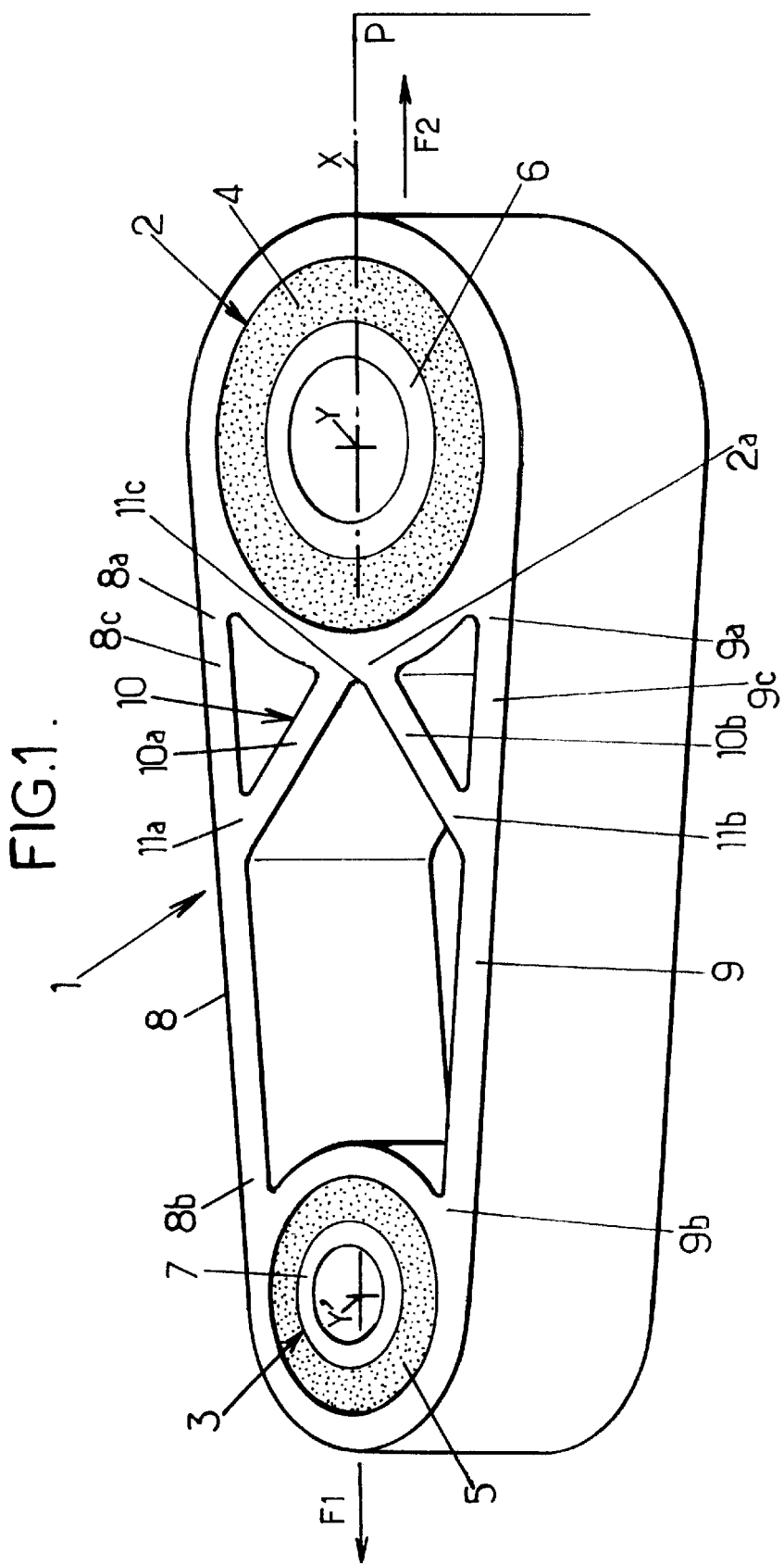
FIG. 1 is a perspective view of a first version of the invention.

With reference to FIGS. 1 to 6, the connecting rod includes mainly a rigid body 1 extending along a longitudinal axis X between two rigid bushes 2 and 3 which are intended to be articulated respectively to the vehicle bodywork and to the engine, along two pivoting axes Y,Y' perpendicular to the axis X.

The body 1 and the bushes 2 and 3 are made of metal, generally moulded in a single cast iron or light alloy piece, and they are symmetrical relative to a median plane P containing the axes X, Y and Y'. Furthermore, the bushes 2 and 3 are generally connected respectively to the bodywork and to the engine by means of elastomer bodies 4 and 5 which are themselves arranged respectively inside the bushes 2 and 3 and which themselves surround respectively internal tubular sheathings 6 and 7.

The body 1 includes in every case two external ribs 8, 9 which each extend approximately along the longitudinal axis X between two corresponding ends 8a, 8b and 9a, 9b which are connected respectively to the two bushes 2 and 3, sand ribs being flattened approximately parallel to the above mentioned median plane P.

The ribs 8 and 9 are intended to work in tension when the connecting rod is subjected to two opposite forces F1, F2 directed respectively along the longitudinal axis X.

Furthermore, in the example of FIG. 1, the body 1 comprises another rib 10 which extends approximately perpendicularly to the longitudinal axis X between the two external longitudinal ribs 8 and 9 and which comprises a median part 11c connected to one of the bushes, for example the bush 2, in a region 2a of it which is contained in the median plane P.

Said rib 10 comprises in addition two ends 11a, 11b which are connected respectively to said external longitudinal ribs 8 and 9, near to the bush 2, so as to have first and second halves 10a and 10 symmetrical relative to the median plane P.

In this way, a first triangular structure is formed, the three sides of which are constituted respectively by the first half 10a of the rib 10, a portion 8c of the rib 8 which extends between the end 11a of the rib 10 and the end 8a of the rib 8, and the portion of the bush 2 which extends between its region 2a and said end 8a of the rib 8.

In the same way, a second triangular structure is formed, the three sides of which are constituted respectively by the second half 10b of the rib 10, a portion 9c of the rib 9 which extends between the end 11b of the rib 10 and the end 9a of the rib 9, and the portion of the bush 2 which extends between its region 2a and said end 9a of the rib 9.

This rib 10 constitutes in fact a transverse reinforcing rib which, in view of its direction and its arrangement near the bush 2, has the effect of advantageously limiting the ovalisation of this latter along the longitudinal axis X, in the case where the connecting rod is tensioned, as indicated by the arrow F2.

In the version shown in FIG. 1, the transverse rib 10 is bent in its median part 11c so that its concavity is directed towards the bush 3.

The bushes 2 and 3 each have a circular cross section, the diameter of the bush 2 being here greater than that of the bush 3.

Figures 2, 3, 4:
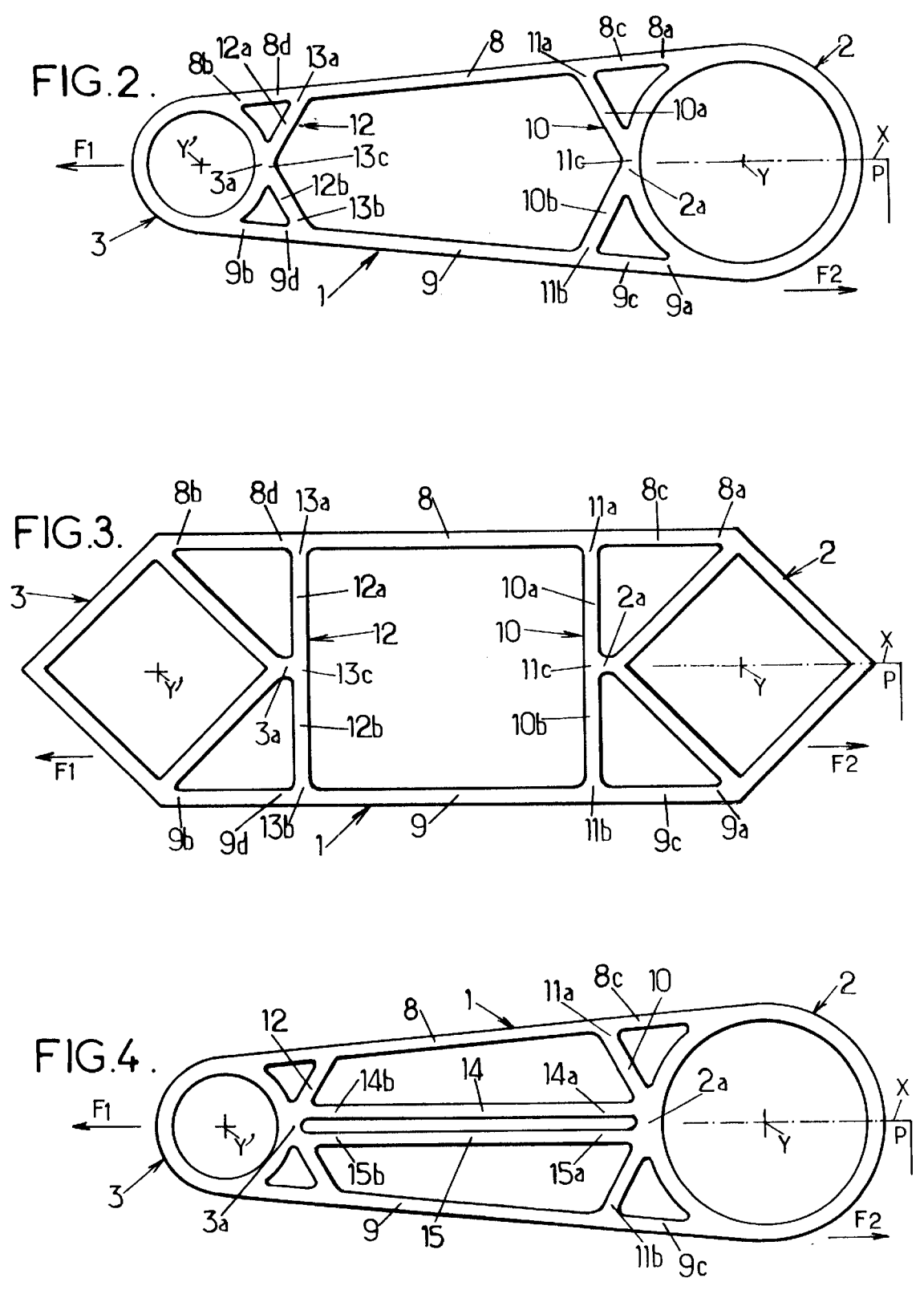

The version illustrated in FIG. 2 corresponds to that shown in FIG. 1 and is only distinguished from it by the fact that the connecting rod comprises another rib 12 which extends approximately perpendicularly to the longitudinal axis X between the two external longitudinal ribs 8 and 9 but which, this time is arranged on the side of the bush 3.

Like the transverse rib 10, the rib 12 comprises a median part 13c connected to the bush 3, in a region 3a of it which is contained in the median plane P.

Said rib 12 also comprises two ends 13a, 13b which are connected respectively to said external longitudinal ribs 8 and 9, near to the bush 3, so as to have first and second halves 12a and 12b symmetrical relative to the median plane P.

In this way, as in the case of the transverse rib 10, a third triangular structure is formed, the three sides of which are constituted respectively by the first half 12a of the rib 12, a portion 8d of the rib 8 which extends between the end 13a of the rib 12 and the end 8b of the rib 8, and the portion of the bush 3 which extends between its region 3a and said end 8b of the rib 8.

In the same way, a fourth triangular structure is formed, the three sides of which are constituted respectively by the second half 12b of the rib 12, a portion 9d of the rib 9 which extends between the end 13b of the rib 12 and the end 9b of the rib 9, and the portion of the bush 3 which extends between its region 3a and said end 9b of the rib 9.

The transverse rib 12 is in addition, like the transverse rib 10, bent in its median part 13c so that its concavity is directed towards the bush 2.

This transverse rib 12 has the same function as the transverse rib 10 with regard to the limitation of a possible ovalisation of the bush 3 along the axis X following a tensioning of the connecting rod, as indicated by the arrow F1.

With reference to FIG. 3, the version illustrated is a variant of the version shown in FIG. 2, according to which the bushes 2 and 3 have, on the one hand, the same cross section, and, on the other hand, a rectangular cross section in place of a circular cross section.

With regard to the transverse ribs 10 and 12, they are no longer bent respectively in their middle, but are each approximately straight and perpendicular to the external longitudinal ribs 8 and 9.

With reference to FIG. 4, the version illustrated corresponds to that shown in FIG. 2 and is only distinguished from it by the fact the connecting rod comprises at least one other rib, for example two ribs 14 and 15 which are arranged between the external longitudinal ribs 8 and 9 and which each extend along the longitudinal axis X between two corresponding ends 14a, 14b and 15a, 15b connecting respectively to the regions 2a and 3a of the bushes 2 and 3. Said ribs 14 and 15 are moreover symmetrical to each other relative to the median plane P and flattened parallel to this latter.

The ribs 14 and 15 thus constitute two additional longitudinal reinforcing ribs which allow, in association with the longitudinal ribs 8 and 9, the resistance to tension of the connecting rod according to the invention to be advantageously reinforced.

Figure 5:
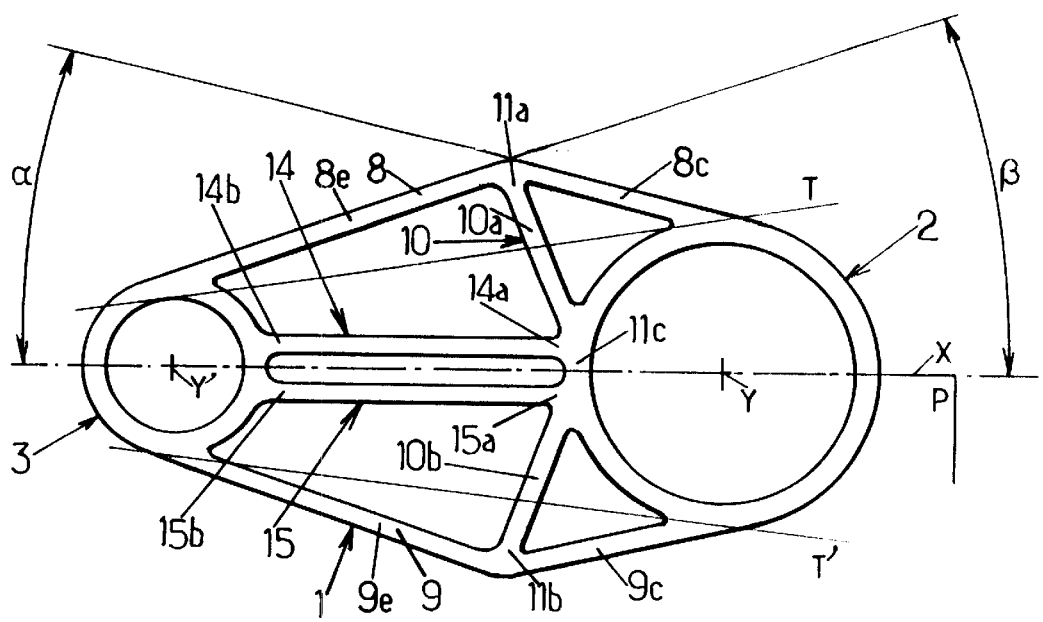

With reference to FIG. 5, the version illustrated corresponds to that shown in FIG. 4 and is only distinguished from it by the fact that the transverse rib 12 has been removed and that the longitudinal ribs 8 and 9 are straighter.

In this example, the portion 8c of the longitudinal rib 8 diverges from the bush 2 forming with the median plane P an acute angle $\alpha$ which is greater than $10°$. This portion 8c is joined, at the end 11a of the transverse rib 10, by the remaining part 8e of the longitudinal rib 8, which itself diverges from the bush 3 forming with the median plane P an acute angle P which is greater than $10°$. In view of the symmetry relative to the median plane P, the portion 9c and the remaining part 9e of the longitudinal rib 9 diverge respectively in the same way as the portion 8c and the remaining part 8e of the longitudinal rib 8.

In view of the value greater than $10°$ of the acute angles $\alpha$ and $\beta$, the ends 11a and 11b of the transverse rib 10 are located sigfnificantly beyond the zone delimited by a first tangent T and a second tangent T' which are respectively common to the two bushes 2 and 3. This arrangement of the ends of the transverse rib, which is not found in the prior art connecting rods, has the significance of rigidifying even more the body 1 of the connecting rod so as to prevent the ovalisation of the bushes 2 and 3 when the latter is subjected to a tensile force.

Figure 6:
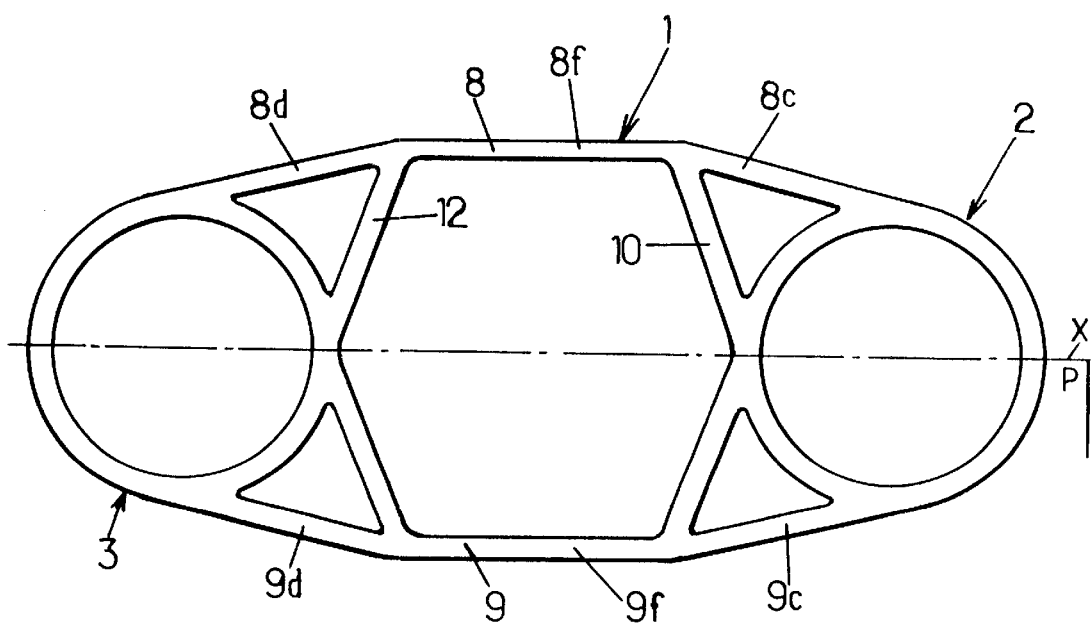

With reference to FIG. 6, the version illustrated is a variant of the version shown in FIG. 2, according to which the bushes 2 and 3 have the same cross section and according to which the first and second portions 8c, 8d of the longitudinal rib 8, just as the first and second portions 9c and 9d of the longitudinal rib 9, diverge respectively from the bushes 2 and 3, each forming, with the median plane P, an acute angle greater than $10°$, as in the case of the version of FIG. 5. The remaining port on 8f of the longitudinal rib 8, which is between the two divergent portions 8c and 8d, is rectilinear and approximately parallel to the median plane P. It is the same for the remaining portion 9f of the longitudinal rib 9, which is itself between the two divergent portions 9c and 9d.

Experience shows that with regard to longitudinal forces, the rigidity of connecting rods of the type shown in FIGS. 1 to 5 is about 2 to 3 times greater than those connecting rods of the prior art, when these connecting rods are considered to be of equal mass.

Thus, for connecting rods each having a mass of, for example, 235 g, it has been observed that a connecting rod of the prior art starts to deform longitudinally under the action of a tensile force equal to about 17 kN, whereas a connecting rod according to the invention starts to deform longitudinally under the action of a tensile force equal to about 40 kN.

Consequently, with a mass reduced to almost half, the connecting rods according to the invention can have the same performances as the connecting rods of the prior art in terms of rigidity and resistance to tension. Their cost is therefore greatly reduced.

It is obvious that the characteristics particular to one of the above mentioned versions could be combined with the characteristics particular to another version.

We claim:

1. A connecting rod intended to limit relative movements between first and second rigid components, mainly in a longitudinal direction, said connecting rod comprising a long rigid body which extends approximately in the longitudinal direction and which connects first and second bushes, these two bushes being intended to be articulated respectively in relation to the rigid components and having respectively central parallel axes perpendicular to the longitudinal direction, said body comprising two opposite longitudinal sides on which are formed respectively first and second external longitudinal ribs which each extend between the first and second bushes, the body of the connecting rod comprising in addition at least one first transverse rib comprising:

a first part which connects the first bush and the first external longitudinal rib so as to form a first triangular structure with a first portion of said first bush and a first portion of the first external longitudinal rib, and a second part connecting the first bush and the second external longitudinal rib so as to form a second triangular structure with a second portion of said first bush and a first portion of the second external longitudinal rib, wherein the first and second external longitudinal ribs each comprise one part which diverges respectively from the first bush with regard, to the direction leading from the first bush to the second bush, forming with the longitudinal direction an acute angle greater than 10°, and wherein the first and second external longitudinal ribs each comprises another part which diverges respectively from the second bush, with regard to the direction leading from the second bush to the first bush, forming with the longitudinal direction an acute angle greater than 10°.

2. A connecting rod according to claim 1, wherein said transverse rib is bent in its middle, having a concavity turned towards the second bush.

3. A connecting rod according to claim 1, wherein the two divergent parts of each external longitudinal rib meet at the junction point between said external longitudinal rib and the first transverse rib.

* * * * *